May 20, 1969 W. A. SEEDER ET AL 3,444,826
METHOD AND APPARATUS FOR MAKING A BAKED EDIBLE TUBULAR PRODUCT
Filed March 29, 1967
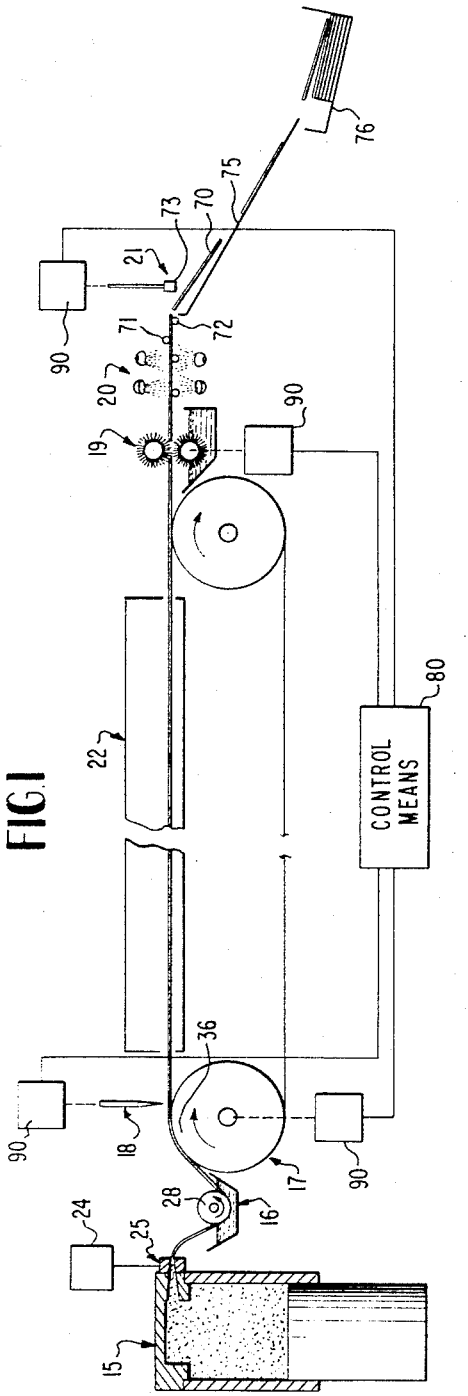
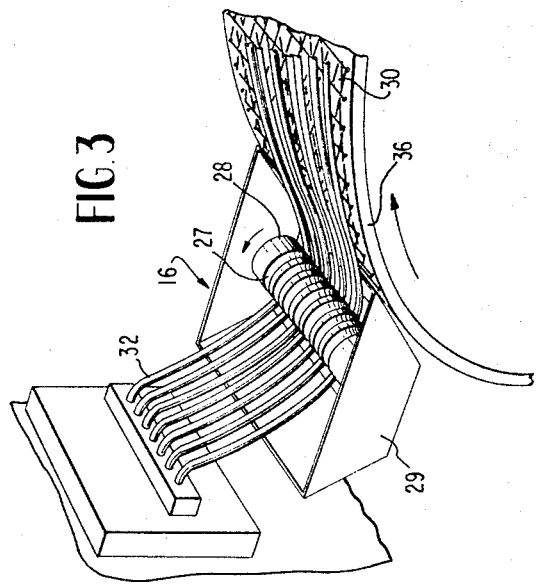
INVENTORS
WILHELM A. SEEDER
FRANCISCUS H. van ZIJL
BY *Wynne & Finken*
ATTORNEYS

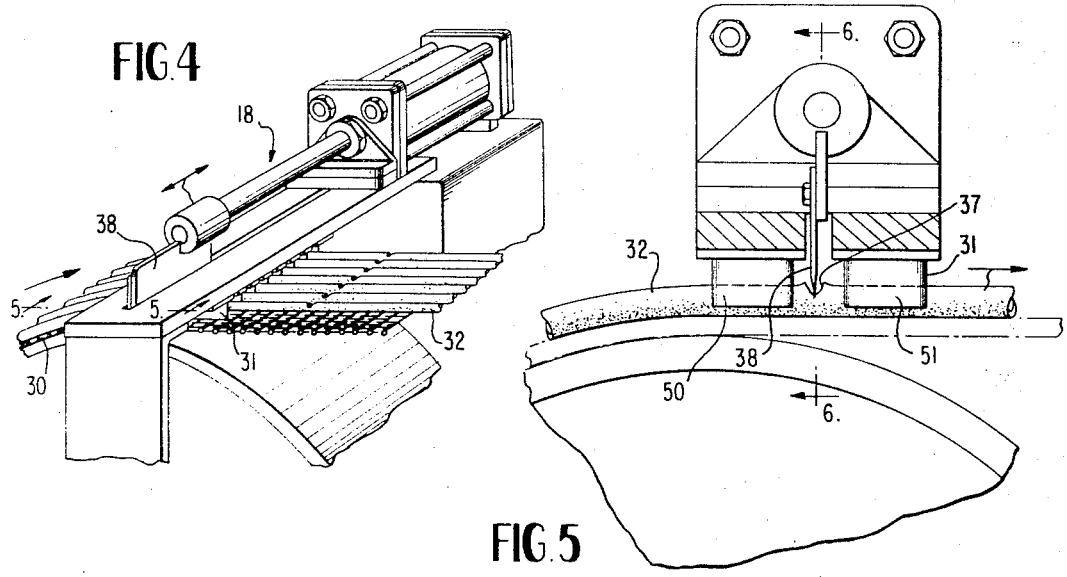
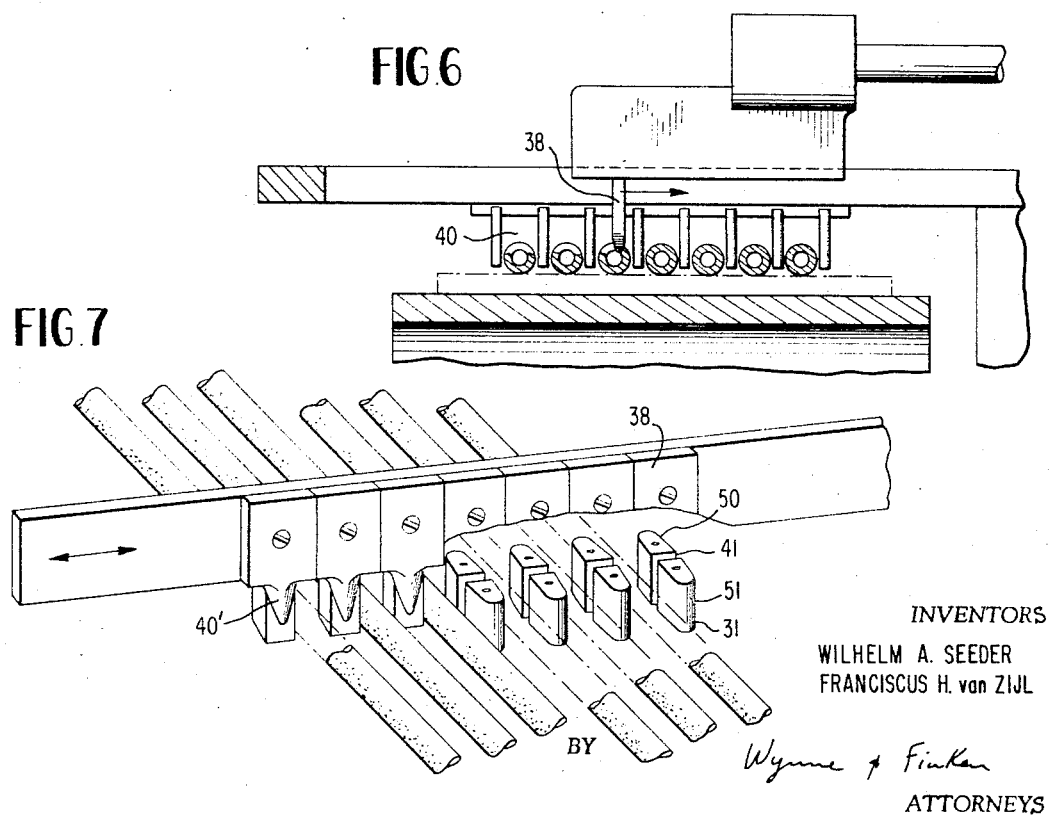

May 20, 1969    W. A. SEEDER ET AL    3,444,826
METHOD AND APPARATUS FOR MAKING A BAKED EDIBLE TUBULAR PRODUCT
Filed March 29, 1967    Sheet 3 of 3

INVENTORS
WILHELM A. SEEDER
FRANCISCUS H. van ZIJL
BY Wynne & Finken
ATTORNEYS

United States Patent Office 3,444,826
Patented May 20, 1969

3,444,826
METHOD AND APPARATUS FOR MAKING A
BAKED EDIBLE TUBULAR PRODUCT
Wilhelm A. Seeder, Aerdenhout, and Franciscus H. van
Zijl, Zaandam, Netherlands, assignors to Koninklijke
Vekade Fabrieken N.V., Zaandam, Noord Holland,
Netherlands, a limited-liability company of the
Netherlands
Filed Mar. 29, 1967, Ser. No. 626,778
Int. Cl. A21c 3/04, 11/10
U.S. Cl. 107—4    9 Claims

ABSTRACT OF THE DISCLOSURE

An alimentary dough having a water insoluble ingredient is extruded through heated nozzles to form tubes; the tubes are partially cut at predetermined locations to form steam vents and to produce weakened sections; the tubes are then baked and the baked tubes are broken by pressure action at the cuts to form the product; coloring material may be applied; flavoring and gloss coating material may be applied.

Background of the invention

The field of the art of the instant invention involves the technique of producing an extruded baked alimentary dough product which may be a drinking tube, cereal product, and the like. The dough recipe includes a water insoluble ingredient which inhibits destruction of the baked tube when in use.

While the paraffin coating of paper and the like are known for inhibiting aqueous deterioration of a drinking tube, the instant invention provides a method and apparatus for producing an edible drinking tube having a long life in an aqueous liquid in a practical and continuous manner.

Summary

This invention relates to a method and apparatus for the preparation of a baked tubular product.

An alimentary dough is prepared with a minimum amount of water soluble sugar and a significant amount of a water insoluble ingredient such as a cereal protein (gluten), a fat with a high melting point, and the like. The water insoluble ingredient enables the production of a baked drinking tube having structural stability in an aqueous solution, so that it may be used in the normal fashion of a drinking tube and eaten during or following the drinking of the liquid.

The dough is extruded through heated tubular extrusion nozzles to produce extruded tubes with the desired smooth surface and noncollapsing wall structure. Separate adjustment of each nozzle temperature enables regulation of nozzle yield and tube consistency.

The unbaked tubes are partially severed or cut at predetermined locations in accordance with the length of product being produced, this cut passing through about ⅓ to ½ the diameter of the tube and providing escape holes for steam produced during baking, as well as weakened sections in the baked tubes for separation into individual or discrete tubes.

The unbaked tubes are placed on an open mesh endless band for conveyance through a tunnel oven and the resultant rigid baked tubes are then separated at the vent openings into the desired product length.

Various treatments of the unbaked and baked tubes are accomplished in the process, such as the application of a coloring material to the unbaked tubes, and the application of a flavoring and gloss material to the baked tubes, followed by drying.

Brief description of the drawings

Other objects and advantages of the present invention will be apparent upon reference to the accompanying description when taken in conjunction with the following drawings, wherein:

FIGURE 1 is a schematic flow diagram of a preferred production line;
FIGURE 2 is a perspective view of the extrusion nozzles;
FIGURE 3 is a view of a roller-type coloring bath;
FIGURE 4 shows a single knife cutting means;
FIGURE 5 is a view taken on line 5—5 of FIGURE 4;
FIGURE 6 is a view taken on line 6—6 of FIGURE 5;
FIGURE 7 shows a multiple knife cutting means.

Description of the preferred embodiments

Figure 8:
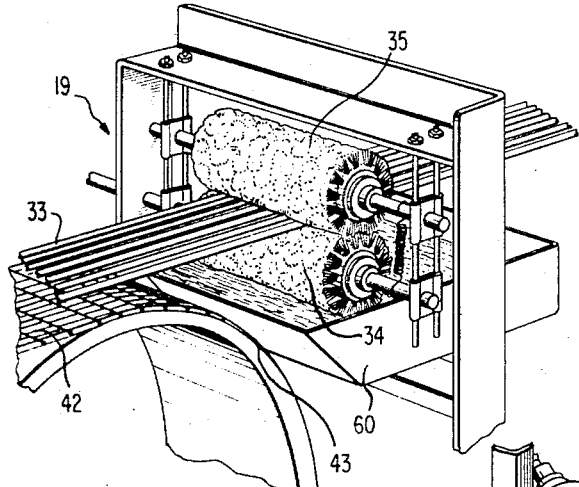
FIGURE 8 is a view of the coating means.

The apparatus of FIGURE 1 includes, in series, extrusion means 15, coloring means 16, conveying means 17, cutting means 18, coating means 19, drying means 20, and separating means 21.

Figure 10:
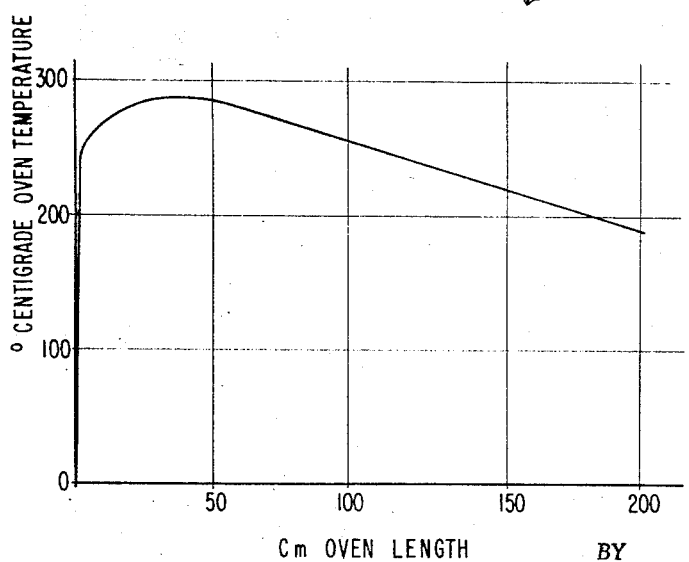
FIGURE 10 is a graph showing the preferred temperature curve in the tunnel oven for the product.

The tunnel oven 22 through which the conveying means 17 passes may be of the type shown in the Leeuwrik U.S. Patent No. 2,949,869, of Aug. 23, 1960. The preferred oven temperatures throughout the length of the tunnel oven are shown in FIGURE 10. A high temperature of about 290° C. is attained within about the first 35 cm. of travel through the oven, followed by a gradual linear reduction to about 190° C. during 165 cm. travel.

A recipe for the preferred dough is as follows:

|  | Grams |
|---|---|
| Soft wheat flour | 1,200 |
| Gluten flour | 200 |
| Selectose (a powdered dextrose syrup) | 200 |
| Nonox spray (a powdered high melting fat) | 200 |
| Sodium cyclamate (Sucaryl) | 6 |
| Water | 600 |

The ingredients are mixed after sieving. Kneed, while water is slowly added, until the right consistency is obtained.

The dough is placed in extrusion means 15 and forced through the tube extrusion nozzles 25 by any suitable means, such as a screw-extruder of known design or, as shown, an upwardly movable piston within a cylinder containing the dough. Such nozzles may be of the general type used in the production of macaroni (as seen in FIGURE 2, each nozzle includes a standard mandrel to provide the normal opening through the tubular macaroni) and have added thereto heating means 26 separately controlled by heating control means 24. Temperature control of each nozzle 25 enables the control of nozzle yield, that is, the extrusion at a regulated rate of a smooth wall tube 32 having a consistency and capability of maintaining its tubular shape during further processing prior to baking. The wall of each nozzle is maintained at a preselected temperature between 35–40° C. The pressure in the nozzles is about 500 p.s.i.

The extruded tubes 32 descend into tank 29 of coloring means 16 and are threaded beneath roller 28 in annular grooves 27 therein. From the coloring means 16 (FIGURE 3) the tubes extend upwardly onto an open wire mesh band 30 and through vertical guide fingers 31 (FIGURE 5) into the tunnel oven 22. The conveying means 17 whose band 30 engages and supports the unbaked tubes 32, tensions then slightly on movement, and draws them upwardly out of the tank 29, through the oven 22 and then projects the resultant rigid baked tubes 33 through the flavoring and glossing brushes 34, 35 of the coating means 19, through the drying means 20, and finally into the separating means 21. Preferably, the endless band 30 engages the unbaked tubes 32 at its arcuate upstream end 36 and provides a slight tensioning on the tubes which is effective back under the roller 28 and upwardly to the extrusion nozzles 25 to produce an initial straightening as the unbaked tubes cool and firm up on passage from the heated extrusion nozzles to the tunnel oven inlet. The roller 28, in combination with the band 30, aids in the orienting and straightening process.

While the break-off vent 37 (FIGURE 5) in each tube 32 could be formed at any location in the line prior to baking, it is preferred that this vent be formed just prior to entrance into the oven, as this enables a final precise alignment by the fingers 31, resulting in a more uniform product. Further, a significant length of each tube is in supported and moving engagement with the band 30 prior to cutting, thereby providing an anchoring of the unbaked tubes against the transverse dislodging force produced during cutting. As seen in FIGURES 4–6, the cutting can be accomplished by a single reciprocating knife 38 which flies rapidly transversely across the upper surfaces of the tubes at a high rate of speed, producing the vent or opening 37 through ⅓ to ½ the diameter of each tube. The cutting means 18 includes the transversely moving knife 38, as well as the vertical guide fingers 31 which define longitudinally extending confined passages 40 about two inches in length. The guide fingers 31 support the unbaked tubes 32 against the transverse force of the knife 38 and establish the final alignment of the tubes within the tunnel oven 22 and a transverse spacing which may be about one or two tube diameters between tubes. It will be noted in FIGURE 5 that the cutting action of the knife 38 is such that a significant opening is formed. Preferably, an upstream set 50 and a downstream set 51 of fingers 31 are provided to insure control of the tubes.

FIGURE 7 shows the type of knife means 18 which can be used if a large number of tubes is being produced. The knife 38 includes a transverse series of cutters 40′ mounted for transverse movement within slots 41 in guide fingers 31, the guide fingers having upstream set 50 and downstream set 51.

The tubes then pass through the tunnel oven 22 and, as seen in FIGURE 8, are projected freely from the band 30 as they leave the horizontal top flight 42 at the arcuate downstream end 43 of the band.

At this location, coating material, such as flavoring and glossing material, is preferably applied by the coating means 19. Application here is preferred because baking causes a significant loss of the flavoring material. The coating material adds further resistance to aqueous destruction. The material is applied by vertically spaced brushes 34, 35 between which the rigid baked tubes 33 pass, the brushes being operated at a speed to produce a peripheral velocity in the direction of and somewhat higher than the velocity of the projected baked tubes 33 to improve the efficiency of the coating operation. The lower brush 34 has its lower portion in a container of liquid 60 and carries a supply to the upper brush (FIGURE 8). The tubes 33 are then dried in the drying means 20 by infrared incandescent lamps 45 positioned around the tubes. The drying means 20 includes an open skeleton framework 46, including support pins 47 on which the tubes ride.

Figure 9:
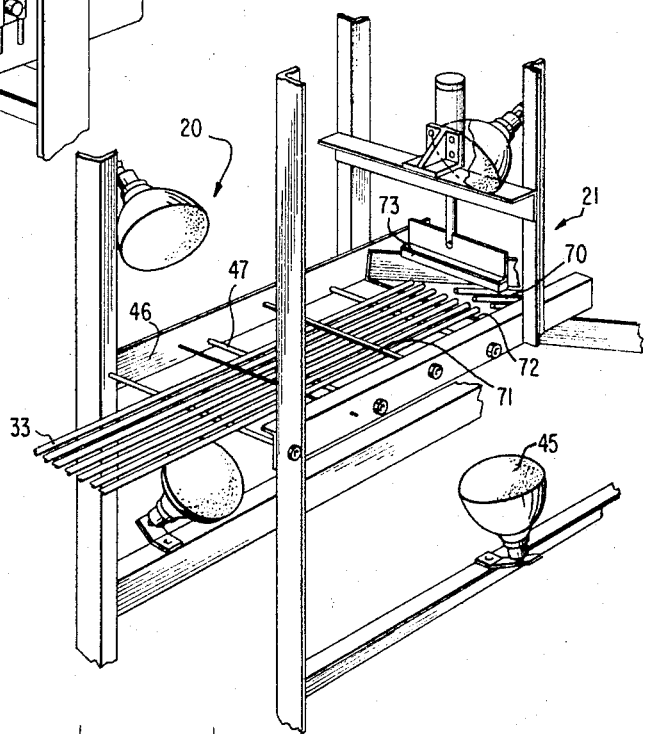
FIGURE 9 is a view of the drying means and separating means.

The terminal portions of the baked tubes 33 are then broken into separate tubes 70 at the vent openings (FIGURES 1 and 9) by the separating means 21, which includes an upstream transverse hold-down member 71 arranged to engage the tops of tubes, an intermediate anvil or transverse support member 72 which is the last bottom support for the tubes in the longitudinally extending flow path, and the downstream vertically moving pressure bar 73 which is actuated to engage the tops of the tubes about two inches downstream from the support member 72 when the transverse series of vents 37 in the tubes 33 is aligned with the support member 72. The discrete or individual tubes 70 then fall onto the slide 75 and are conducted to hopper 76 for further handling.

A material such as Teflon is preferred for the surfaces which contact the unbaked tubes, for example, the roller 28, guide fingers 31, and knife 38.

The recipe for the coloring bath may be as follows:

| | Grams |
|---|---|
| Sunset yellow | 0.125 |
| Water | 100 |

The residence time of the tubes in the coloring bath is preferably less than 10 seconds. Surface coloring is preferred because the addition of color to the dough requires a high concentration of color to obtain the desired shades, and this influences the taste of the product.

The baking time for the tubes is about six minutes; the velocity of the tubes along the production line and through the 200 cm. oven, which is about six feet, is about one foot per minute.

The recipe for the flavoring and gloss coating material may be as follows:

| | | |
|---|---|---|
| Water | l__ | 1 |
| Gluten flour | g__ | 100 |
| Glacial acetic acid | g__ | 6 |

Mix and leave the mixture resting for two days. Add an emulsifier of 2 g. of a mixture of glyceryl monostearate, glyceryl mono oleate and lecithin and a flavoring of 40 ml. of orange oil or the like and emulsify under prevention of foam formation.

The apparatus needed for employing a standard tunnel oven is believed fully disclosed by this description. In certain situations, an added conveying means to carry the unbaked tubes to the oven band may be desirable. Various driving means 90 for driving the operating elements of the conveying means 17, the cutting means 18, the coating means 19, and the separating means 21 may be employed including, for example, hydraulic, pneumatic, mechanical, electrical and the like. The product can also be formed in short lengths for the production of a breakfast food or the like. Edible drinking tubes may vary in length from 6 inches to 12 inches or more.

The entire apparatus is preferably automated through a suitable control means 80 (FIGURE 1) coupled to the driving means 90 whereby, for example, the separating means 21 is actuated in timed relationship with the cutting means 18 to insure the positioning of a series of openings 37 at the anvil 72 when the pressure bar 73 is moved downwardly to break the tubes. The control means 80 would include adjusting means for regulating the timing of these actions in accordance with the extrusion rate.

Since the instant invention is not directed to any specific control and/or power system, it is believed that those skilled in the art, and particularly in the bakery art, will understand that standard control and power systems presently on the market and in use can be utilized and installed to accomplish the desired functions of the instant invention and further to provide adjustability.

While the invention has been described with reference to certain embodiments, they are to be considered illustrative rather than limiting, and it is intended to cover all further embodiments that fall within the spirit and scope of the appended claims.

What is claimed is:

1. A method for the preparation of a baked tubular product comprising:
   preparing an alimentary dough having a minimum amount of water soluble sugar and a significant amount of a water insoluble ingredient;
   extruding continuously a plurality of tubes of the prepared dough through nozzles at a pressure of about 500 p.s.i., heating the surfaces of the tubes during extrusion to produce a smooth tube surface and a tube of substantial structural integrity so that it does not collapse;
   regulating the surface smoothness and structural integrity of each tube by separately controlling the temperature of each tube extrusion nozzle to about 35–40° C.;
   coloring the tubes by threading them downwardly beneath a grooved guide roller in a color bath;
   conveying said tubes by threading them upwardly from the roller into engagement with the arcuate top surface of a perforate endless band at the upstream end of a tunnel oven;
   forming tube openings by transversely cutting the walls of the tubes at predetermined locations along the lengths thereof to release steam formed during baking and to establish the length of the desired product, holding the tubes against transverse movement during cutting and longitudinally aligning same for movement through a tunnel oven;
   baking the tubes in the tunnel oven;
   coating the tubes;
   drying the coated tubes; and
   transversely breaking the dried tubes into discrete lengths by impacting the tubes to cause breakage at the weakened sections formed by said openings.

2. A method for the preparation of a baked tubular product comprising:
   preparing a dough having an ingredient in an effective amount which is not dissolved by water;
   extruding continuously a tube of the prepared dough;
   conveying the tube;
   forming openings through the wall of the tube at predetermined locations along the length thereof to release steam formed during baking and to establish the length of the desired product; and then
   baking the tube; and then
   transversely breaking the baked tube at the openings into a plurality of discrete tubes.

3. A method of defined in claim 2 and including:
   coloring the outer surface of the extruded tube prior to forming openings therein;
   coating the baked tube; and then
   drying the coated tube.

4. Apparatus for the preparation of a baked tubular product utilizing an oven comprising:
   extrusion means for continuously forming a tube from dough;
   conveying means for supporting and moving the tube through the oven;
   cutting means for forming an opening in the unbaked tube at predetermined locations along its length to release steam formed during baking and to establish the length of the dseired product;
   separating means for breaking the baked tube at an opening to produce a discrete tubular product.

5. Apparatus as defined in claim 4 and wherein said extrusion means includes a tubular extrusion nozzle having controlled heating means to provide dough contact surfaces of a temperature of about 35–40° C. to produce a smooth-surfaced noncollapsing tube of unbaked dough.

6. Apparatus as defined in claim 4 and wherein said cutting means includes a transversely moving knife for cutting the top wall of the tube and vertical guide fingers adjacent thereto defining a passage for holding the tube during cutting in longitudinal alignment with the inlet of the oven.

7. Apparatus as defined in claim 6 and wherein said separating means includes an upstream transverse hold-down member arranged to engage the top of the tube, an intermediate anvil on which the tube rides, and a downstream pressure bar movable to engage the tube and break the tube at an opening when the opening is at said anvil.

8. Apparatus for the preparation of a baked tubular product utilizing a tunnel oven comprising:
   extrusion means for continuously forming a plurality of longitudinally aligned tubes from dough;
   coloring means for coloring the outer surfaces of the unbaked tubes;
   cutting means for forming openings in the unbaked tubes at predetermined transversely aligned locations along their lengths to release steam formed during baking and to establish the length of the desired discrete product;
   conveying means including an open mesh endless band for supporting and moving the tubes through the tunnel oven;
   separating means for breaking projecting baked tubes at the locations of said openings to produce discrete tubular products;
   said extrusion means including tubular extrusion nozzles each having separately controlled heating means to provide dough contact surfaces of a temperature of about 35–40° C. to produce smooth-surfaced noncollapsing tubes;
   said coloring means including a tank for coloring liquid positioned below said nozzles and an annularly grooved roller for aligning receipt thereunder of the tubes;
   said conveying means having an arcuate upstream end for receiving the tubes from said roller, a substantially horizontal top flight for carrying the tubes through said cutting means and tunnel oven, and an arcuate downstream end for enabling free projection of rigid baked tubes through said separating means;
   said cutting means including a transversely moving knife for cutting the top walls of the tubes and immediately downstream thereof vertical guide fingers defining a transverse series of passages for holding the tubes during cutting in longitudinal alignment with the inlet of the tunnel oven;
   said separating means including an upstream transverse hold-down member arranged to engage the tops of tubes, an intermediate anvil on which the tubes ride, and a downstream pressure bar movable to engage the tubes and break the tubes at the openings when the openings are at said anvil.

9. Apparatus as defined in claim 8 and including:
   coating means positioned downstream of said arcuate downstream end of said conveying means; and
   drying means positioned downstream of said coating means;
   said coating means including a pair of rotary brushes arranged to receive the projected rigid baked tubes therebetween for application of coating material, the speed of rotation of said brushes providing a peripheral tube engaging movement in the direction of and faster than the movement of the tubes;

said drying means including transverse support pins for said coated tubes and drying lamps.

References Cited

UNITED STATES PATENTS

| | | |
|---|---|---|
| 1,118,182 | 11/1914 | Brandell. |
| 2,173,000 | 9/1939 | Holtzman et al. |
| 2,615,809 | 10/1952 | Jean _____ 99—85 |
| 2,677,613 | 5/1954 | Shiah _____ 99—85 |
| 2,956,519 | 10/1960 | Angell. |
| 3,138,462 | 6/1964 | Katz et al. _____ 99—85 |
| 3,344,753 | 10/1967 | Ramsey. |

WALTER A. SCHEEL, *Primary Examiner.*

JOSEPH SHEA, Jr., *Assistant Examiner.*

U.S. Cl. X.R.

99—85, 138; 107—54; 225—96